United States Patent
Devane et al.

(10) Patent No.: US 11,411,991 B2
(45) Date of Patent: Aug. 9, 2022

(54) USER ACTIVITY-TRIGGERED URL SCAN

(71) Applicant: McAfee, LLC, San Jose, CA (US)

(72) Inventors: Oliver G. Devane, Upton (GB); Abhishek Karnik, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 290 days.

(21) Appl. No.: 16/506,267

(22) Filed: Jul. 9, 2019

(65) Prior Publication Data
US 2021/0014269 A1 Jan. 14, 2021

(51) Int. Cl.
*H04L 9/40* (2022.01)
*G06F 16/953* (2019.01)

(52) U.S. Cl.
CPC ........ *H04L 63/1483* (2013.01); *G06F 16/953* (2019.01); *H04L 63/1416* (2013.01); *H04L 63/1425* (2013.01)

(58) Field of Classification Search
CPC ............ H04L 63/1483; H04L 63/1416; H04L 63/1425; G06F 16/953
USPC ........................................................ 726/23
See application file for complete search history.

(56) References Cited

U.S. PATENT DOCUMENTS

| | | | | |
|---|---|---|---|---|
| 8,521,667 B2* | 8/2013 | Zhu | ..................... | H04L 63/1408 706/13 |
| 8,910,279 B2* | 12/2014 | Yanovsky | ........... | H04L 63/1425 726/22 |
| 9,224,006 B1* | 12/2015 | Firestone | ............ | G06F 21/6227 |
| 9,338,137 B1* | 5/2016 | Fedko | ................... | H04L 63/105 |
| 2010/0186088 A1* | 7/2010 | Banerjee | ................. | G06F 21/51 709/224 |
| 2011/0087781 A1* | 4/2011 | Kim | ..................... | H04L 63/1441 709/225 |
| 2012/0030293 A1* | 2/2012 | Bobotek | ................ | G06Q 10/10 709/206 |
| 2014/0090055 A1* | 3/2014 | Palumbo | .............. | H04L 63/145 726/22 |
| 2014/0331119 A1* | 11/2014 | Dixon | .................... | G06Q 30/02 715/234 |
| 2015/0134956 A1* | 5/2015 | Stachura | ............. | H04L 63/0807 713/168 |
| 2016/0028673 A1* | 1/2016 | Jeyaraman | .............. | H04L 51/32 709/206 |
| 2016/0127475 A1* | 5/2016 | PalChaudhuri | ......... | H04L 67/28 709/203 |
| 2017/0195363 A1* | 7/2017 | Dahan | ................. | H04L 63/1416 |
| 2018/0191777 A1* | 7/2018 | Volkov | ................ | H04L 63/1483 |
| 2019/0020664 A1* | 1/2019 | Wood | ................... | H04L 63/1483 |
| 2019/0132357 A1* | 5/2019 | Damian | ............. | H04L 63/1416 |
| 2020/0004989 A1* | 1/2020 | Lockhart, III | ...... | G06F 21/6263 |

FOREIGN PATENT DOCUMENTS

WO 2018208669 A1 11/2018

* cited by examiner

*Primary Examiner* — Badri Badrinarayanan Champakesan
(74) *Attorney, Agent, or Firm* — Patent Capital Group

(57) ABSTRACT

There is disclosed in one example a computing apparatus, including: a hardware platform including a processor and a memory; a network interface; a user-space application including instructions to interact with a web site via a uniform resource locator (URL); and a security agent including instructions to: intercept an interaction of the user-space application with the web site; determine that the intercepted interaction is to send sensitive information to the web site; suspend the interaction; and assign a reputation to the URL.

18 Claims, 12 Drawing Sheets

USER ACTIVITY-TRIGGERED URL SCAN

FIELD OF THE SPECIFICATION

This application relates in general to computer security, and more particularly though not exclusively to a system and method for providing a user activity-triggered uniform resource locator (URL) scan.

BACKGROUND

"Phishing" is a style of attack wherein an attacker attempts to convince a user to send sensitive information to the attacker.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
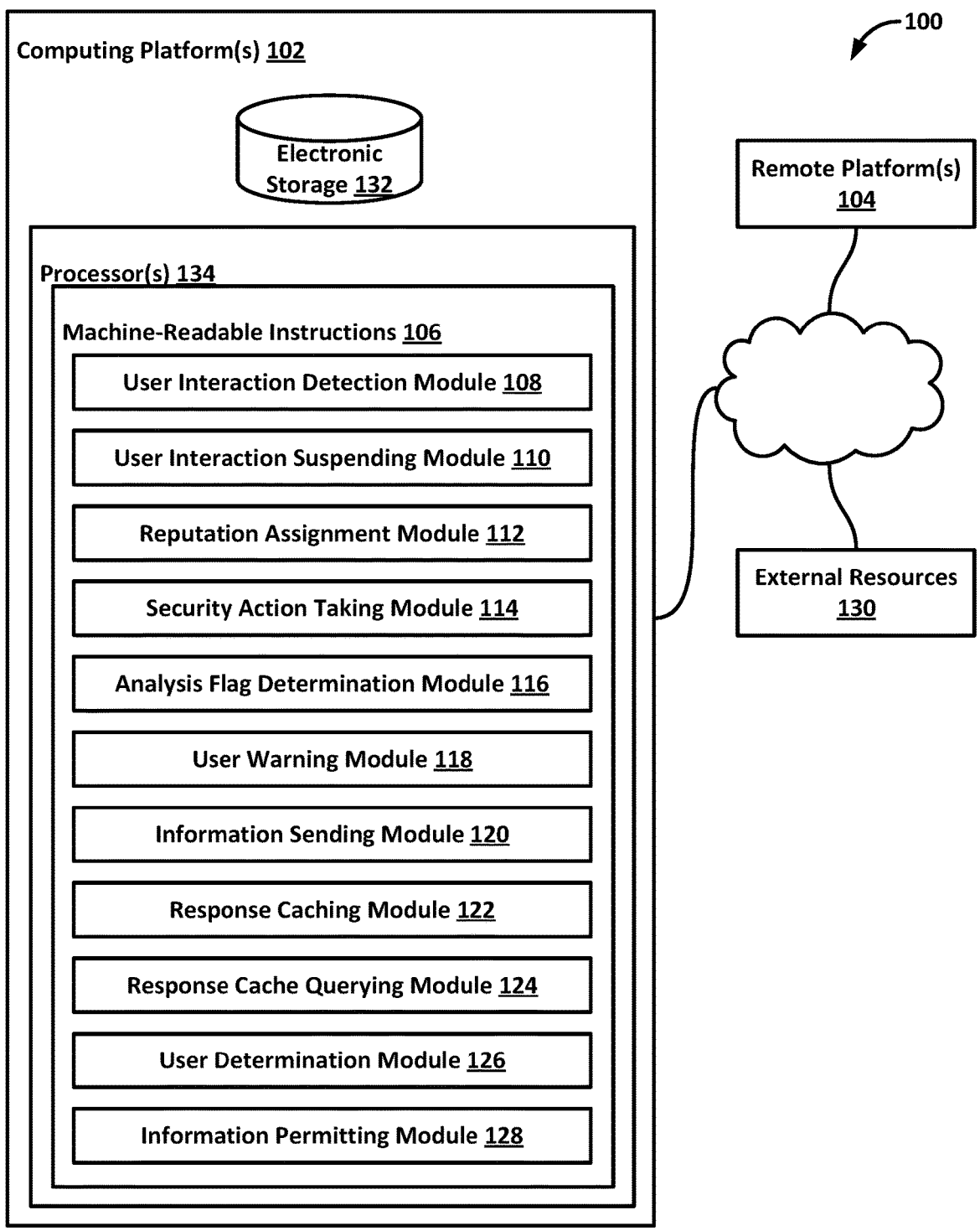
FIG. 1 illustrates a system configured for providing browser-based phishing mitigation for a web site.

In an example, there is disclosed a computing apparatus, comprising: a hardware platform comprising a processor and a memory; a network interface; a user-space application comprising instructions to interact with a web site via a uniform resource locator (URL); and a security agent comprising instructions to: intercept an interaction of the user-space application with the web site; determine that the intercepted interaction is to send sensitive information to the web site; suspend the interaction; and assign a reputation to the URL.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A "phishing" attack occurs when an attacker attempts to convince a user to provide sensitive information, which could include, for example, a username, password, Social Security number, banking information, personally-identifying information (PII), proprietary information, confidential information, classified information, or any other sensitive information. Phishing is essentially a social engineering attack. The point of phishing is not to necessarily compromise the device itself, but rather to convince the user to voluntarily supply the sensitive information.

For example, one form of phishing attack uses false websites that are designed to look like the legitimate websites of banks or other institutions to which a user may legitimately supply information. For example, if a customer of ABC Bank normally logs into the "ABCBank.com" website to conduct online banking, then a phishing attacker may create a fake website that is designed to look identical to the ABCBank.com website. The attacker then secures a suspicious uniform resource locator (URL), such as:

ABCBank.com.go.7rxpt4.co.IL

At first glance, the user ignores the elements following ABCBank.com, and instead believes that those elements are merely the kind of hypertext markup language (HTML) GET code that is commonly used after URLs. Thus, the user clicks on the malicious link, and is directed to a website that looks like the ABCBank.com website. The user dutifully fills in his or her username and password for ABCBank.com, and appears to encounter an error or a failure to load the next page. The user then types in "ABCBank.com" in order to log in again, and this time is successful. In this case, the user may not even realize that he or she has been the subject of a phishing attack. The malicious actor has collected the target's username and password without the target even realizing it. The attacker can then log in to ABCBank.com, and can divert funds or cause other mischief.

Phishing attacks can take many different forms, such as false charities, false banking sites, false sweepstakes, false genealogy sites, or other sites that attempt to collect personal information that can be used to compromise data security.

Security service providers may be able to provide security agents that help to defeat these types of phishing attacks. For example, a security services provider such as MCAFEE, LLC may provide a global reputation store such as MCAFEE, LLC's global threat intelligence (GTI™), which includes a global cache of reputations for many different kinds of objects. This can include cache reputations for many different phishing sites, which can be identified by URL and other characteristics.

One challenge of a global reputation cache is that phishing sites are aware of these caches, and thus use tricks to get around the reputations. For example, many phishing sites will change their URLs frequently, as often as once or more per hour, thus defeating caches that are based solely on URL identification.

A security agent installed on a user's local machine can also be used to identify malicious websites, even in the absence of a known reputation for the website. For example, a security agent may analyze the website code for telltale signs of phishing attacks. When telltale signs of phishing attacks are identified, the site can be marked as malicious, and may be subjected to further analysis by a cloud-based security analysis engine.

While local or cloud-based security engines are very effective at identifying phishing sites, they may do so in human perceptible time periods. This means that when a user is browsing the internet, if he encounters an unknown website, a local or cloud-based security agent may need to analyze that website and assign it a reputation before the user is permitted to visit the website. While this can be effective at identifying phishing sites, one limitation is that it occurs in a human perceptible time. This means that a user can experience frustration and delay while using his or her computer, and ultimately may come to feel that the security agent is the problem. If the user disables the security agent to provide a smoother web surfing experience, it does not matter how effective the security agent is in theory. It is not operating, and thus cannot protect the user. Thus, security can be a daunting task in an environment where phishing websites are created on an hourly basis to trick users into submitting account credentials, credit card numbers, Social Security numbers, or other sensitive details so that they can be used by or sold to malicious actors.

An improvement to a security agent that detects phishing websites based on source code (i.e., HTML and script analysis may recognize that phishing analysis is not necessarily required the first time the user encounters the website). While heuristic detection of a potentially malicious website is valuable, it is not necessarily valuable if the user does not attempt to submit any information to the website. For example, the user himself may recognize that the website is "phishy," and decide not to enter any information. If the user, on his own, is able to detect the suspicious nature of the website, then the analysis by the phishing engine is superfluous. Similarly, if the website provides only passive content, or does not provide any facility for the user to enter information, then a detailed phishing analysis may be unnecessary. Furthermore, even if the website is a phishing website, and the user does not detect that on his own, a detailed analysis may be superfluous if the user simply elects not to enter any information. For example, if the user encounters a phishing website made to look like the ABCBank.com website, even though the website is malicious and the user has failed to detect that fact, it may not matter if the user is a customer of XYZ Bank, and thus has no reason to enter information into the alleged ABCBank.com website.

Similarly, even if a detailed phishing analysis is not to be performed on the website—such as in the case where the website does, in fact, have a cached reputation either locally or in a global or cloud-based reputation store—the user experience may still be slowed down if a query is made for every website before the user is allowed to visit it. The user experience can be improved when a URL classification—either by lookup or by detailed local or cloud-based analysis—is triggered on the website only once the user attempts to transmit information, such as via an HTML POST or other operation. In many cases, this HTML POST operation (whether user-initiated or automated) represents the true point of danger—the point at which the user's information may be compromised. If action on the website is deferred until the HTML POST or similar operation occurs, then the user experience is still very streamlined, because most users will not submit any information to most websites they visit.

Once the HTML POST operation occurs, a security agent can detect the operation, intercept the attempted operation, and suspend action until a sufficient reputation can be assigned to the website. This can include first checking a local cache to see if the website has a locally cached reputation. If there is no locally cached reputation, then a query may be made to a cloud-based or global cache to see if there is a globally recognized reputation for the URL.

In the case that no reputation is returned, then several options are available. In the first place, the user may be warned of the attempted operation, and of the potential harm that may occur if the user completes the attempted data submission. Also, the user may be asked if he or she is sure that they want to post the data to the URL.

Furthermore, if the reputation does not have a known "good" or "clean" reputation, then additional local or cloud-based analysis may be performed. This may analyze the website and its code to determine with higher confidence whether the website is a phishing site, or whether the website has the characteristics of a phishing website.

Depending on the result of this analysis, the attempted action may be blocked outright, or some other security action may be taken, such as notifying the user, requesting confirmation from the user, notifying an enterprise security administrator, updating security tokens on an enterprise network, or taking some other action.

In some cases, there may be a user or enterprise configurable option to specify whether an aggressive scan is to be performed, or how aggressive a scan should be provided. If aggressive scanning has been disabled, then the user may be warned that a high confidence reputation for the website cannot be determined, and the user may be in danger. The user may then be presented with an additional option to perform a one-time aggressive scan of the website before the user submits information. In other embodiments, the level of scanning may be designated by a more granular designation than a simple "aggressive" or "not aggressive." In that case, a warning may be triggered if the aggressiveness setting is below a particular threshold.

Advantages can be realized by triggering analysis or reputation lookup for a website on a defined user action versus triggering on the first encounter of the website. Alerting on unknown websites may cause excessive false positives. In contrast, by triggering or alerting when potential account data or PII are being posted, false positives are reduced and detection of malicious websites can be increased. This can be accomplished because the user may feel free to set a more aggressive scan option, because the security agent itself is less disruptive of the user's overall web surfing experience.

The method disclosed also provides enhanced visibility to users on the recipient of proposed data to be posted to the URL. Because analysis or lookup are triggered only on an attempted POST or similar action, it is reasonable to provide more information to the user. For example, not only can the user be alerted of the potential of data loss, but the user can also be shown information that may be available from public records, such as DNS record information for the URL, or other information gleaned about the operator. If the account has been anonymized, or the information is otherwise unavailable, this itself can be an indication that the website is less likely to be legitimate. For example, ABC Bank generally does not have any reason to hide the fact that it owns and operates the ABCBank.com domain name. But the owner and operator of an illegitimate and questionable domain name may have many reasons to hide their identity.

In some embodiments, the action taken by the user after encountering the URL may be cached. For example, if the user trusts the website—such as because the user has information not available to the security agent that gives the user confidence that the website is legitimate—then the user's allowance may be locally cached. Similarly, if the user blocks or disallows the operation, that action may also be locally cached. Because local cache lookups can be orders of magnitude faster than remote lookups or in-depth analysis, a local cache of user interaction may be maintained so that cached actions can be quickly queried, and the security agent can quickly make a decision the next time the URL is encountered.

This prevents continuous notification to the end user if they repeatedly visit the same unknown site, either one that they know is clean, or one that they have marked as unclean and that continuously loads, for example, in the background (e.g., in third-party advertisements). Thus, embodiments of the system disclosed provide both a whitelist and a blacklist functionality that can be used to effectively reduce the prompts provided to the end user for URLs that are frequently visited and/or loaded.

A system and method for providing a user activity-triggered URL scan will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 illustrates a system 100 configured for providing browser-based phishing mitigation for a web site. In some implementations, system 100 may include one or more computing platforms 102. Computing platform 102 may be configured to communicate with one or more remote platforms 104 according to a client/server architecture, a peer-to-peer architecture, and/or other architectures. Remote platform 104 may be configured to communicate with other remote platforms via computing platform 102 and/or according to a client/server architecture, a peer-to-peer architecture, and/or other architectures. Users may access system 100 via remote platform 104.

Computing platform 102 may be configured by machine-readable instructions 106. Machine-readable instructions 106 may include one or more instruction modules. The instruction modules may include computer program modules. The instruction modules may include one or more of user interaction detection module 108, user interaction suspending module 110, reputation assignment module 112, security action taking module 114, analysis flag determination module 116, user warning module 118, information sending module 120, response caching module 122, response cache querying module 124, user determination module 126, information permitting module 128, and/or other instruction modules.

User interaction detection module 108 may be configured to detect a user interaction with a web site via the browser. Detecting the user interaction may include detecting an HTML POST operation. The user interaction may include sending sensitive information to the web site.

User interaction suspending module 110 may be configured to suspend the user interaction.

Reputation assignment module 112 may be configured to, while the user interaction is suspended, assign a reputation to the web site. Assigning the reputation to the website may include performing a deep security analysis of the website. The deep security analysis may include analyzing the websites code for phishing features. By way of nonlimiting example, assigning the reputation may include querying a user feature for a deep analysis flag, and performing deep analysis only if the deep analysis flag is set. By way of nonlimiting example, assigning the reputation may include querying a user-configurable scan aggressiveness option, and performing a scan of the web sites code for phishing features according to the user-configurable scan aggressiveness option.

By way of nonlimiting example, assigning the reputation to the website may include querying a cloud-based reputation cache, and receiving a reputation for the website from the cloud-based reputation cache. By way of nonlimiting example, assigning the reputation to the website may further include first querying a local cache of the cloud-based reputation cache, and querying the cloud-based reputation cache only if no locally cached reputation exists in the local cache. By way of nonlimiting example, assigning the reputation to the website may further include determining that a cloud-based reputation from the cloud-based reputation cache is unknown, and triggering a local deep analysis of the web site. By way of nonlimiting example, triggering the local deep analysis of the web site may include first querying a local deep analysis configuration option, and performing a deep analysis only if the local deep analysis configuration option is set.

Security action taking module 114 may be configured to take a security action based on the assigned reputation.

Analysis flag determination module 116 may be configured to determine that the deep analysis flag is not set.

User warning module 118 may be configured to warn the user of a potential for data loss because the website has not been analyzed via deep analysis.

User warning module 118 may be configured to warn the user if the user-configurable scan aggressiveness option is set below a threshold.

User warning module 118 may be configured to warn the user of potential data loss.

User warning module 118 may be configured to warn the user of potential data loss if the local deep analysis configuration option is not set.

Information sending module 120 may be configured to send the sensitive information only after receiving confirmation from the user.

Response caching module 122 may be configured to cache a response from the user in a response cache.

Response cache querying module 124 may be configured to query the response cache.

User determination module 126 may be configured to determine that the user has previously permitted sensitive information to be submitted to the web site. The sensitive information may include a password. The sensitive information may include a username and password combination. The sensitive information may include personally-identifying information.

Information permitting module 128 may be configured to permit the sensitive information to be submitted without requiring a further response from the user.

In some implementations, computing platform 102, remote platform 104, and/or external resources 130 may be operatively linked via one or more electronic communication links. For example, such electronic communication links may be established, at least in part, via a network such as the internet and/or other networks. It will be appreciated that this is not intended to be limiting, and that the scope of this disclosure includes implementations in which computing platform 102, remote platform 104, and/or external resources 130 may be operatively linked via some other communication media.

A given remote platform 104 may include one or more processors configured to execute computer program modules. The computer program modules may be configured to enable an expert or user associated with the given remote platform 104 to interface with system 100 and/or external resources 130, and/or provide other functionality attributed herein to remote platform 104. By way of nonlimiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Computing platform 102 may include electronic storage 132, one or more processors 134, and/or other components. Computing platform 102 may include communication lines, or ports to enable the exchange of information with a network and/or other computing platforms. Illustration of computing platform 102 in FIG. 1 is not intended to be limiting. Computing platform 102 may include a plurality of hardware, software, and/or firmware components operating together to provide the functionality attributed herein to computing platform 102. For example, computing platform 102 may be implemented by a cloud of computing platforms operating together as computing platform 102.

Electronic storage 132 may comprise non-transitory storage media that electronically stores information. The electronic storage media of electronic storage 132 may include one or both of system storage that is provided integrally (i.e., substantially non-removable) with computing platform 102 and/or removable storage that is removably connectable to computing platform 102 via, for example, a port (e.g., a universal serial bus port, a FireWire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, random access memory, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor 134, information received from computing platform 102, information received from remote platform 104, and/or other information that enables computing platform 102 to function as described herein.

Processor 134 may be configured to provide information processing capabilities in computing platform 102. As such, processor 134 may include one or more of a digital processor, an analog processor, a digital circuit designed to process information, an analog circuit designed to process information, a state machine, and/or other mechanisms for electronically processing information. Although processor 134 is shown in FIG. 1 as a single entity, this is for illustrative purposes only. In some implementations, processor 134 may include a plurality of processing units. These processing units may be physically located within the same device, or processor 134 may represent processing functionality of a plurality of devices operating in coordination. Processor 134 may be configured to execute modules 108, 110, 112, 114, 116, 118, 120, 122, 124, 126, and/or 128, and/or other modules. Processor 134 may be configured to execute modules 108, 110, 112, 114, 116, 118, 120, 122, 124, 126, and/or 128, and/or other modules by software; hardware; firmware; some combination of software, hardware, and/or firmware; and/or other mechanisms for configuring processing capabilities on processor 134. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, and/or 128 are illustrated in FIG. 1 as being implemented within a single processing unit, in implementations in which processor 134 includes multiple processing units, one or more of modules 108, 110, 112, 114, 116, 118, 120, 122, 124, 126, and/or 128 may be implemented remotely from the other modules. The description of the functionality provided by the different modules 108, 110, 112, 114, 116, 118, 120, 122, 124, 126, and/or 128 described below is for illustrative purposes, and is not intended to be limiting, as any of modules 108, 110, 112, 114, 116, 118, 120, 122, 124, 126, and/or 128 may provide more or less functionality than is described. For example, one or more of modules 108, 110, 112, 114, 116, 118, 120, 122, 124, 126, and/or 128 may be eliminated, and some or all of its functionality may be provided by other ones of modules 108, 110, 112, 114, 116, 118, 120, 122, 124, 126, and/or 128. As another example, processor 134 may be configured to execute one or more additional modules that may perform some or all of the functionality attributed below to one of modules 108, 110, 112, 114, 116, 118, 120, 122, 124, 126, and/or 128.

FIGS. 2A-2G illustrate a method 200 for providing browser-based phishing mitigation for a web site. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A-2G and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Figure 2A:
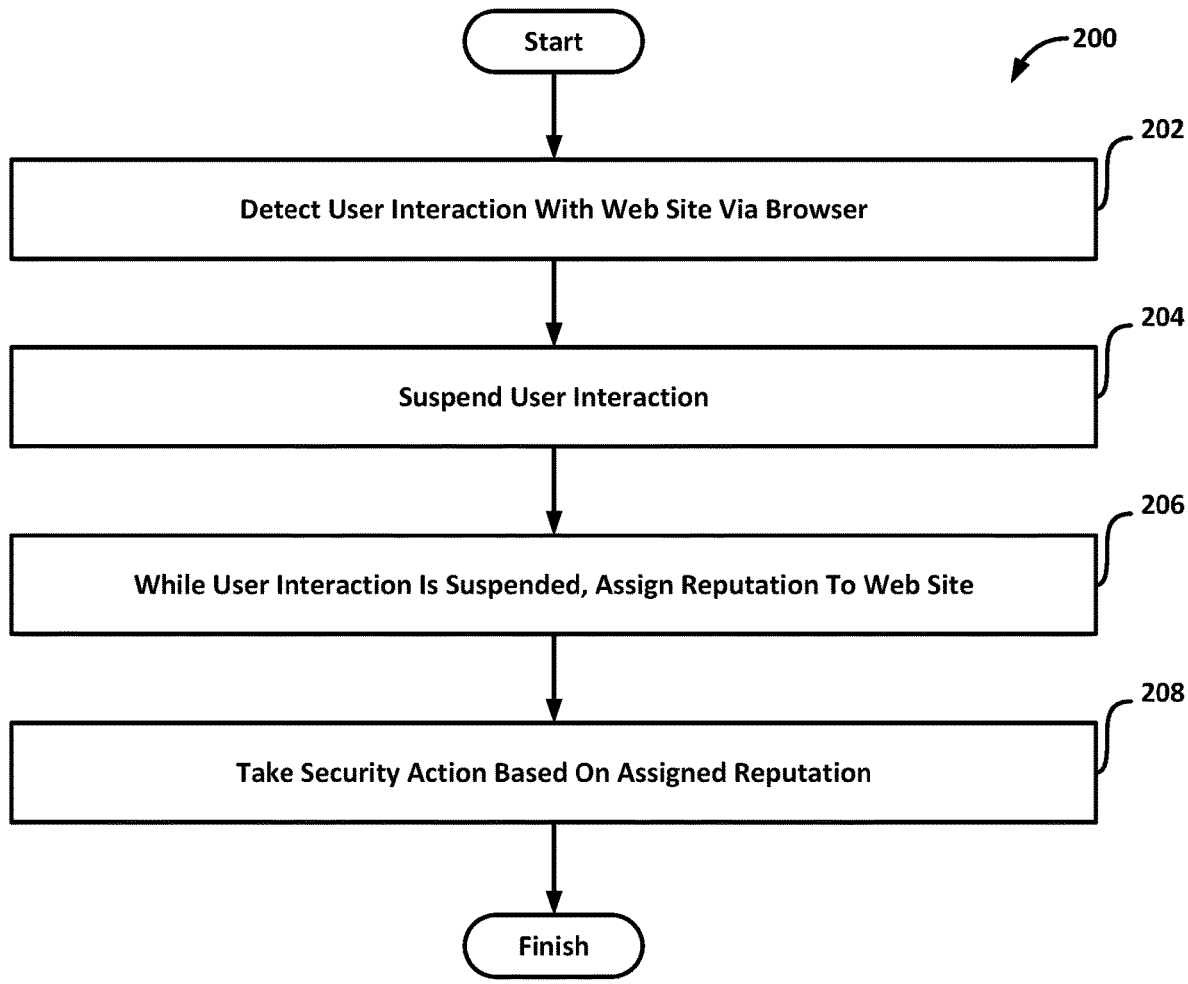
FIGS. 2A-2G illustrate a method for providing browser-based phishing mitigation for a web site.

FIG. 2A illustrates method 200, in accordance with one or more implementations.

An operation 202 may include detecting a user interaction with a web site via the browser. The user interaction may include sending sensitive information to the web site. Operation 202 may be performed by one or more hardware processors configured by machine-readable instructions including a module that is the same as or similar to user interaction detection module 108, in accordance with one or more implementations.

An operation 204 may include suspending the user interaction. Operation 204 may be performed by one or more hardware processors configured by machine-readable instructions including a module that is the same as or similar to user interaction suspending module 110, in accordance with one or more implementations.

An operation 206 may include while the user interaction is suspended, assigning a reputation to the web site. Operation 206 may be performed by one or more hardware processors configured by machine-readable instructions including a module that is the same as or similar to reputation assignment module 112, in accordance with one or more implementations.

An operation 208 may include taking a security action based on the assigned reputation. Operation 208 may be performed by one or more hardware processors configured by machine-readable instructions including a module that is the same as or similar to security action taking module 114, in accordance with one or more implementations.

Figure 2B:
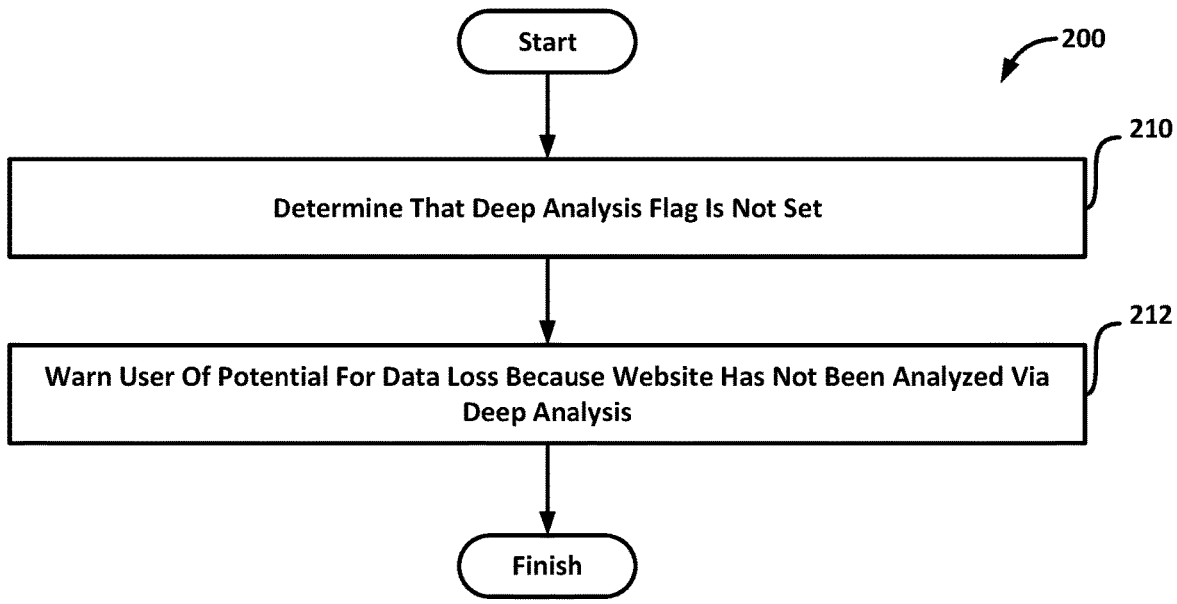

FIG. 2B illustrates method 200, in accordance with one or more implementations.

An operation 210 may further include determining that the deep analysis flag is not set. Operation 210 may be performed by one or more hardware processors configured by machine-readable instructions including a module that is the same as or similar to analysis flag determination module 116, in accordance with one or more implementations.

An operation 212 may include warning the user of a potential for data loss because the website has not been analyzed via deep analysis. Operation 212 may be performed by one or more hardware processors configured by machine-readable instructions including a module that is the same as or similar to user warning module 118, in accordance with one or more implementations.

Figure 2C:
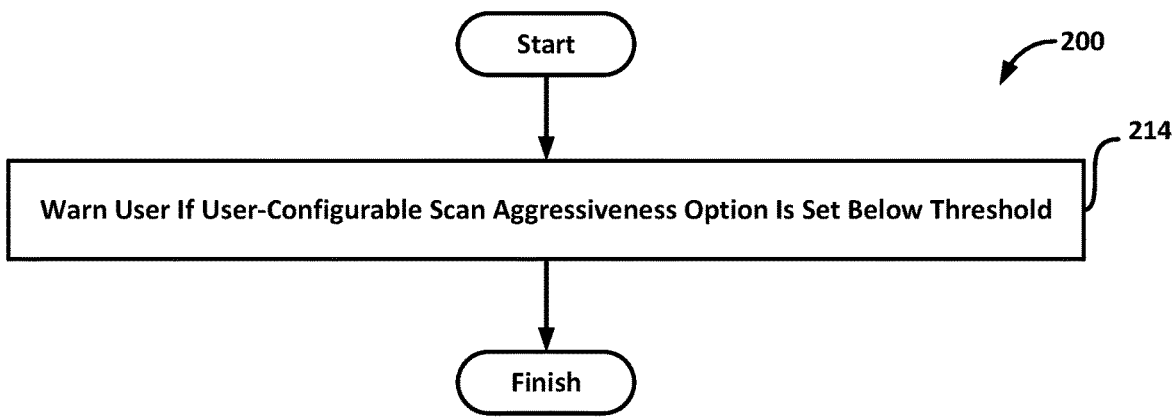

FIG. 2C illustrates method 200, in accordance with one or more implementations.

An operation 214 may further include warning the user if the user-configurable scan aggressiveness option is set below a threshold. Operation 214 may be performed by one or more hardware processors configured by machine-readable instructions including a module that is the same as or similar to user warning module 118, in accordance with one or more implementations.

Figure 2D:
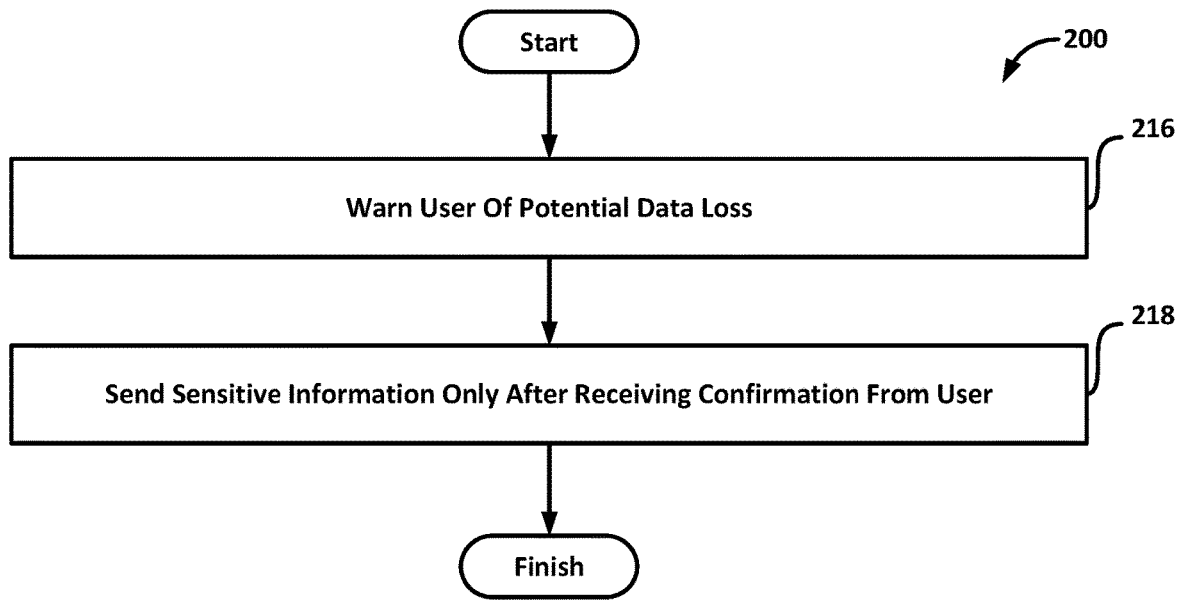

FIG. 2D illustrates method 200, in accordance with one or more implementations.

An operation 216 may further include warning the user of potential data loss. Operation 216 may be performed by one or more hardware processors configured by machine-readable instructions including a module that is the same as or similar to user warning module 118, in accordance with one or more implementations.

An operation 218 may include sending the sensitive information only after receiving confirmation from the user. Operation 218 may be performed by one or more hardware processors configured by machine-readable instructions including a module that is the same as or similar to information sending module 120, in accordance with one or more implementations.

Figure 2E:
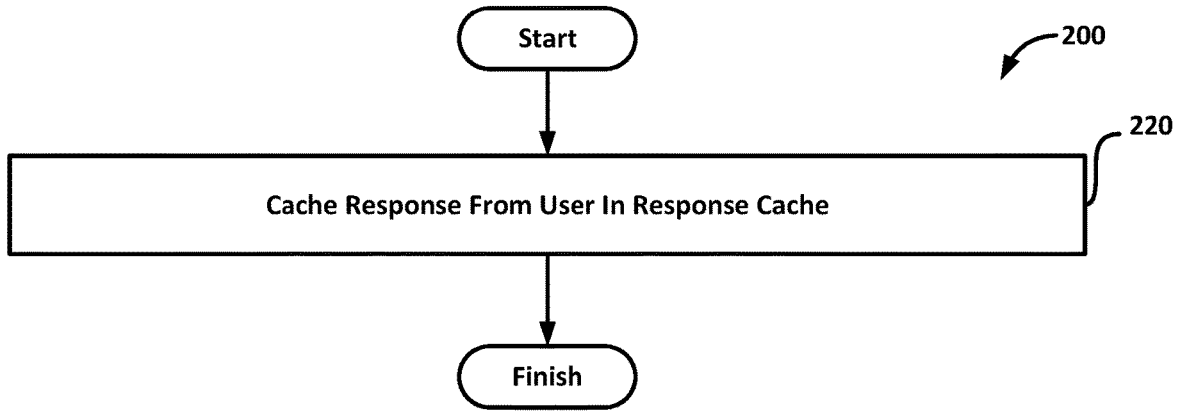

FIG. 2E illustrates method 200, in accordance with one or more implementations.

An operation 220 may include further including caching a response from the user in a response cache. Operation 220 may be performed by one or more hardware processors configured by machine-readable instructions including a module that is the same as or similar to response caching module 122, in accordance with one or more implementations.

Figure 2F:
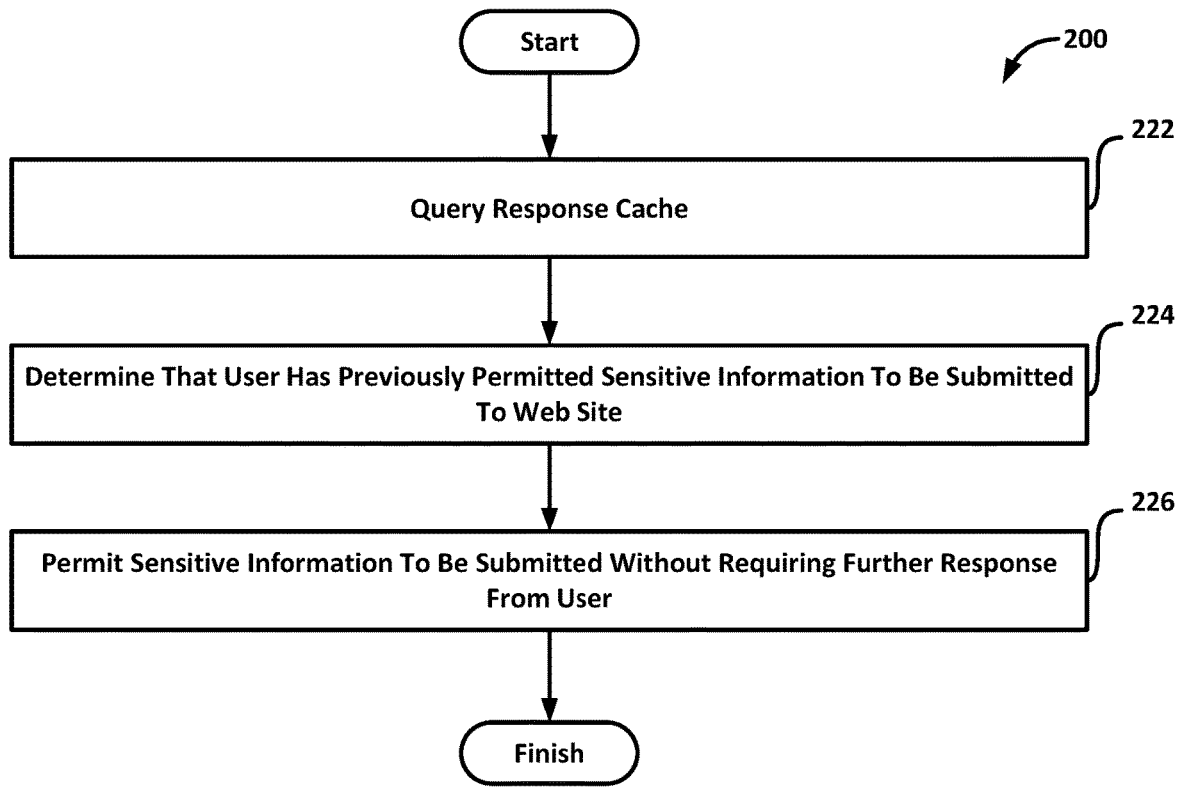

FIG. 2F illustrates method 200, in accordance with one or more implementations.

An operation 222 may include querying the response cache. Operation 222 may be performed by one or more hardware processors configured by machine-readable instructions including a module that is the same as or similar to response cache querying module 124, in accordance with one or more implementations.

An operation 224 may include determining that the user has previously permitted sensitive information to be submitted to the web site. Operation 224 may be performed by one or more hardware processors configured by machine-readable instructions including a module that is the same as or similar to user determination module 126, in accordance with one or more implementations.

An operation 226 may include permitting the sensitive information to be submitted without requiring a further response from the user. Operation 226 may be performed by one or more hardware processors configured by machine-readable instructions including a module that is the same as or similar to information permitting module 128, in accordance with one or more implementations.

Figure 2G:
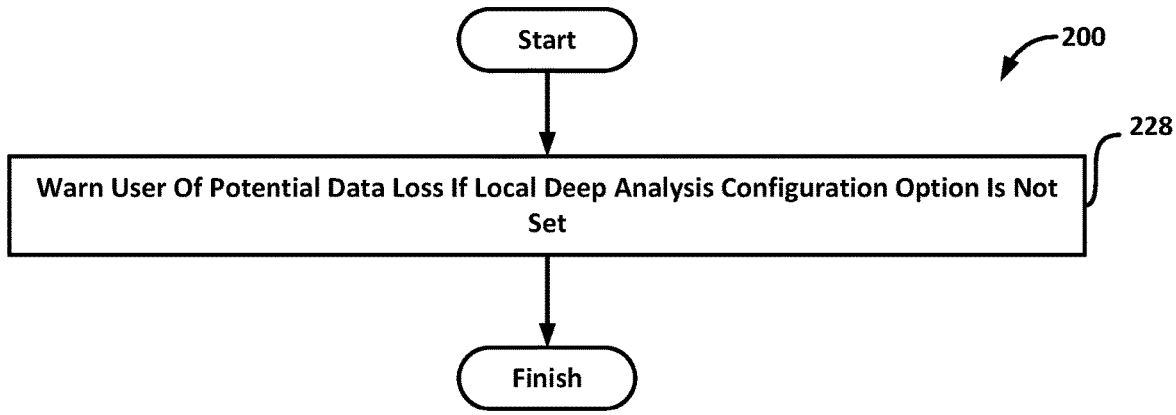

FIG. 2G illustrates method 200, in accordance with one or more implementations.

An operation 228 may include further including warning the user of potential data loss if the local deep analysis configuration option is not set. Operation 228 may be performed by one or more hardware processors configured by machine-readable instructions including a module that is the same as or similar to user warning module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 3:
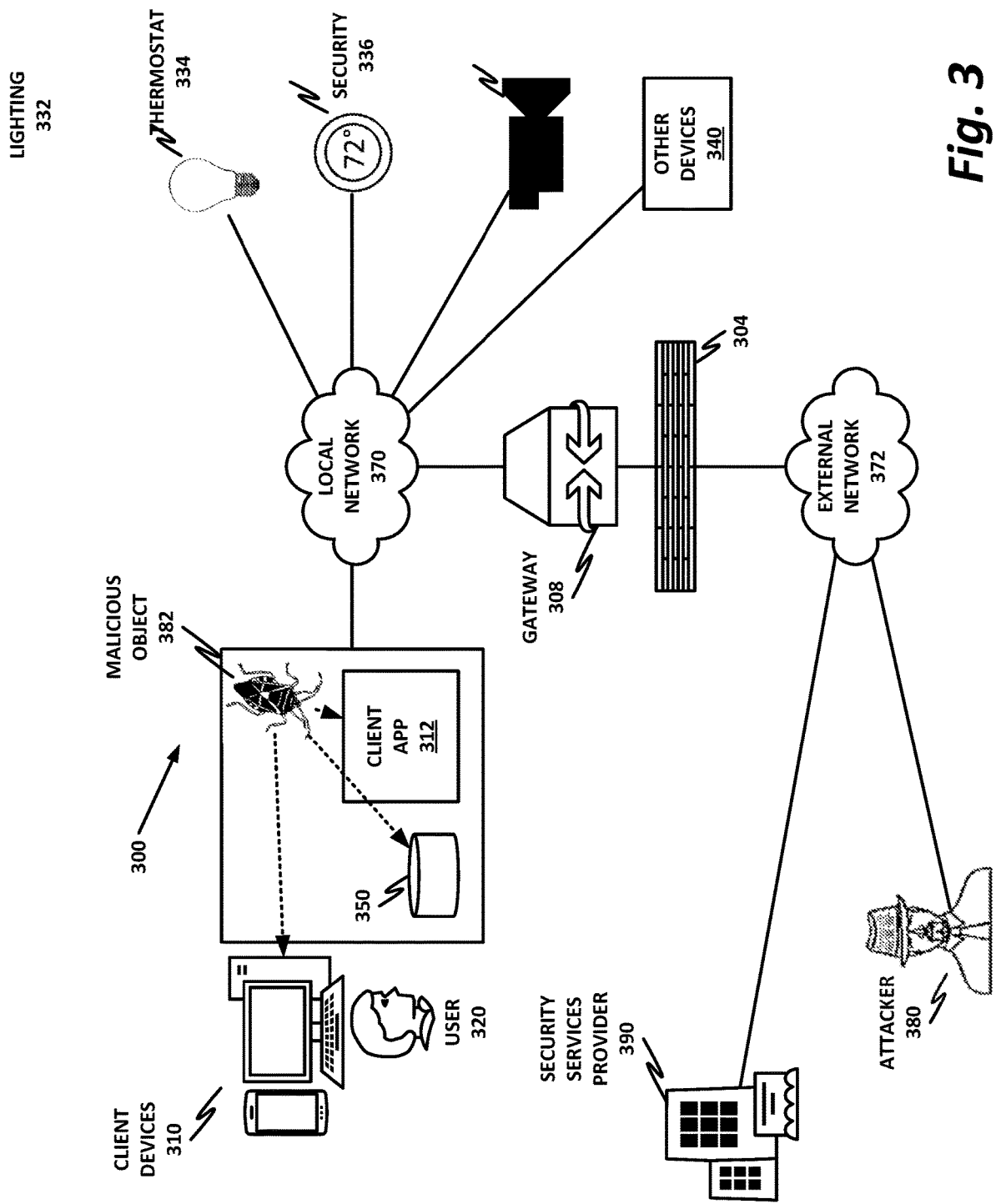
FIG. 3 is a block diagram illustrating a security ecosystem.

FIG. 3 is a block diagram of a security ecosystem 300. Embodiments of security ecosystem 300 may be configured or adapted to provide a user-triggered URL scan as disclosed in the present specification.

In the example of FIG. 3, security ecosystem 300 may be an enterprise, a government entity, a data center, a telecommunications provider, a "smart home" with computers, smart phones, and various Internet of things (IoT) devices, or any other suitable ecosystem. Security ecosystem 300 is provided herein as an illustrative and nonlimiting example of a system that may employ, and benefit from, the teachings of the present specification.

Within security ecosystem 300, one or more users 320 operate one or more client devices 310. A single user 320 and single client device 310 are illustrated here for simplicity, but a home or enterprise may have multiple users, each of which may have multiple devices, such as desktop computers, laptop computers, smart phones, tablets, hybrids, or similar.

Client devices 310 may be communicatively coupled to one another and to other network resources via local network 370. Local network 370 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 370 may also include one or more servers, firewalls, routers, switches, security appliances, antivirus servers, or other network devices, which may be single-purpose appliances, virtual machines, containers, or functions. Some functions may be provided on client devices 310.

In this illustration, local network 370 is shown as a single network for simplicity, but in some embodiments, local network 370 may include any number of networks, such as one or more intranets connected to the Internet. Local network 370 may also provide access to an external network, such as the Internet, via external network 372. External network 372 may similarly be any suitable type of network.

Local network 370 may connect to the Internet via gateway 308, which may be responsible, among other things, for providing a logical boundary between home network 372 and external network 370. Local network 370 may also provide services such as dynamic host configuration protocol (DHCP), gateway services, router services, and switching services, and may act as a security portal across local boundary 304.

Local network 370 may also include a number of discrete IoT devices. For example, local network 370 may include IoT functionality to control lighting 332, thermostats or other environmental controls 334, a security system 336, and any number of other devices 340. Other devices 340 may include, as illustrative and nonlimiting examples, network attached storage (NAS), computers, printers, smart televisions, smart refrigerators, smart vacuum cleaners and other appliances, and network connected vehicles.

Local network 370 may communicate across local boundary 304 with external network 372. Local boundary 304 may represent a physical, logical, or other boundary. External network 372 may include, for example, websites, servers, network protocols, and other network-based services. In one example, an attacker 380 (or other similar malicious or negligent actor) also connects to external network 372. A security services provider 390 may provide services to local network 370, such as security software, security updates, network appliances, or similar. For example, McAfee, Inc. provides a comprehensive suite of security services that may be used to protect local network 370 and the various devices connected to it.

It may be a goal of users 320 to successfully operate devices on local network 370 without interference from attacker 380. In one example, attacker 380 is a malware author whose goal or purpose is to cause malicious harm or mischief, for example, by injecting malicious object 382 into client device 310. Once malicious object 382 gains access to client device 310, it may try to perform work such as social engineering of user 320, a hardware-based attack on client device 310, modifying storage 350 (or volatile memory), modifying client application 312 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 380 to leverage against local network 370.

Malicious harm or mischief may take the form of installing root kits or other malware on client devices 310 to tamper with the system, installing spyware or adware to collect personal and commercial data, defacing websites, operating a botnet such as a spam server, or simply to annoy and harass users 320. Thus, one aim of attacker 380 may be to install his malware on one or more client devices 310 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 380 may also want to commit industrial or other espionage, such as stealing classified or proprietary data, stealing identities, or gaining unauthorized access to enterprise resources. Thus, attacker 380's strategy may also include trying to gain physical access to one or more client devices 310 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 380. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 370 may contract with or subscribe to a security services provider 390, which may provide security services, updates, antivirus definitions, patches, products, and services. McAfee®, Inc. is a nonlimiting example of such a security services provider that offers comprehensive security and antivirus solutions. In some cases, security services provider 390 may include a threat intelligence capability such as the global threat intelligence (GTI™) database provided by McAfee Inc., or similar competing products. Security services provider 390 may update its threat intelligence database by analyzing new candidate malicious objects as they appear on client networks and characterizing them as malicious or benign.

Other security considerations within security ecosystem 300 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

In one embodiment, attacker 380 operates a phishing operation, and wants to target user 320, and/or client devices 310. For example, attacker 380 may be trying to compromise account information, credentials, or PII of user 320. In the case that user 320 is a member of an enterprise with valuable information (e.g., confidential, proprietary, restricted, classified, or otherwise secret or publicly unavailable data), attacker 380 may be trying to compromise the enterprise itself. For example, if attacker 380 can gain the credentials of user 320, then attacker 380 may be able to access resources on a local enterprise network 370, and thereby compromise the security of the network.

Figure 4:
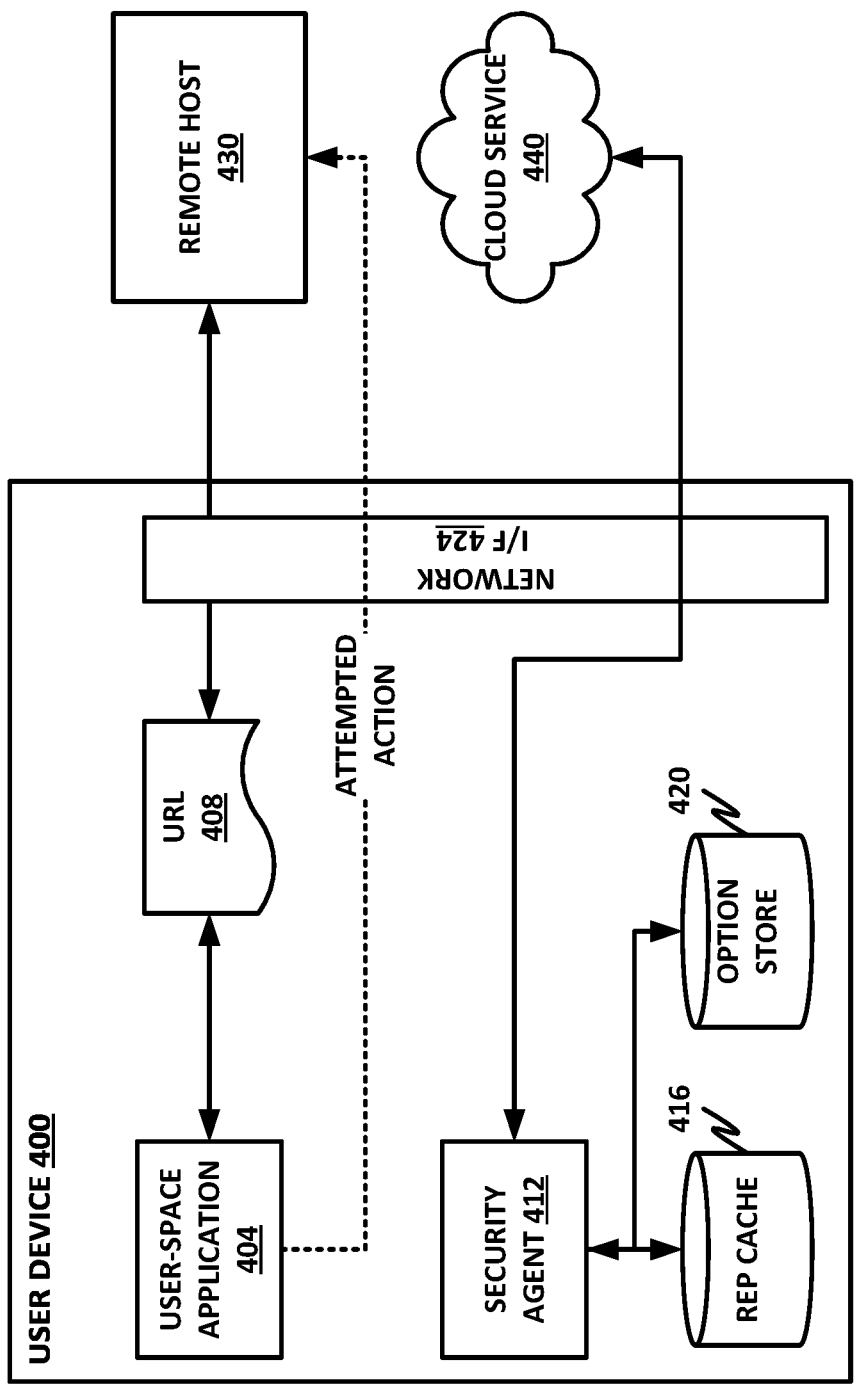
FIG. 4 is a block diagram illustrating selected elements of a user device, and how they operate together in a security ecosystem.

FIG. 4 is a block diagram illustrating selected elements of a user device 400, and how they operate together in a security ecosystem. In FIG. 4, only selected elements of user device 400 are shown. These selected elements are selected because they illustrate certain aspects of the present specification. However, it should not be implied or assumed that the configuration of user device 400 is the only one possible, or that all elements of user device 400 are necessarily illustrated.

In this example, user device 400 includes a user-space application 404, and a security agent 412. User-space application 404 and security agent 412 communicate outside of user device 400 via a network interface 424.

Security agent 412 includes, by way of example, an option store 420, which is used to store user or enterprise configurable options, such as triggering events for a scan, aggressiveness of scan, or other options.

Security agent 412 also includes a reputation cache 416, which may also include a cache of other locally cached information, such as user responses, reputations, or similar. Security agent 412 operates with a cloud service 440. Cloud service 440 may include a global cache of reputation information, which may be more extensive than local reputation cache 416. However, the global cache of cloud service 440 may have some real-time limitations, such as in identifying phishing URLs that change frequently, such as hourly.

User-space application 404 may be a web browser, or any other user-space application that accesses a URL 408. URL 408 points to a remote host 430. Remote host 430 may operate a legitimate website, or may operate a malicious website, such as a phishing website.

When a user operates user-space application 404, the user may access many different URLs. These URLs may have known or unknown reputations, and those reputations may be queried by security agent 412, either via cloud service 440 or local reputation cache 416.

In one example, a user operating user-space application 404 takes an attempted action. The attempted action in this example is one that will send sensitive data to remote host 430. For example, the attempted action may be an HTML post from the user's browser. However, this is a nonlimiting example. Other examples include cases where user-space application 404 could be operating in the background, or could even be a driver or other background service. In that case, the user-space application 404 may access URL 408 and attempt to send data to remote host 430, either with or without the user's knowledge. In either case, security agent 412 may not need to assign a reputation to URL 408 the first time that it encounters URL 408. So long as remote host 430 is sending information to user device 400, but not collecting information from user device 400, then in some examples security agent 412 need not assign a reputation to URL 408.

However, intervention is triggered by the attempted action. As described above, the attempted action may be an action that sends data from user device 400 to remote host 430, such as via an HTML POST operation, a data packet, a payload, or other transmission. In that case, security agent 412 may operate with low-level operating system permissions. Thus, security agent 412 is able to intercept the attempted action, such as via operating system hooks, HTML application, or some other similar software method or structure that enables security agent 412 to intercept the operation. Security agent 412 then suspends the attempted action until it can assign a reliable reputation to URL 408. Assigning a reliable reputation may comprise first querying local reputation cache 416 to see if there is a locally cached reputation for URL 408. If there is a locally cached reputation, then security agent 412 may take an appropriate security action based at least in part on that reputation. For example, if the reputation is clean, then the operation may be allowed. If the reputation is malicious, the action may be blocked outright.

If no locally cached reputation is found in reputation cache 416, security agent 412 may query cloud service 440 for a reputation. Again, based at least in part on the reputation, security agent 412 may take an appropriate security action.

If no cached reputation is found from cloud service 440 or local reputation cache 416, then security agent 412 may, in some cases, subject URL 408 and the code hosted thereon to a security scan. Based on user or enterprise configurable options within option store 420, the scan may be more or less aggressive. In general, a less aggressive scan will take less time and fewer resources, but will be less reliable. In some cases, security agent 412 does not perform the analysis on URL 408, but rather security agent 412 provides URL 408 to cloud service 440, and permits enterprise-grade servers in cloud service 440 to perform the analysis.

Once security agent 412 has analyzed URL 408, either locally or remotely, it may assign a reputation to remote host 430 and/or URL 408. This reputation may be cached in local reputation cache 416, and/or in cloud service 440.

In some cases, based on options within option store 420, aggressive scanning may be disabled, or a less aggressive scan may be set. In that case, security agent 412 may at least warn the end user that a high-reliability scan has not been made on remote host 430. Security agent 412 may give the user the option of allowing the action, disallowing the action, or of performing a one-off aggressive scan on URL 408 and content hosted at URL 408.

An allow or disallow may be cached within local reputation cache 416. Thus, if URL 408 is encountered again on the same machine, either by the same user-space application 404, or by a different user-space application, then appropriate action may be taken.

Figure 5A:
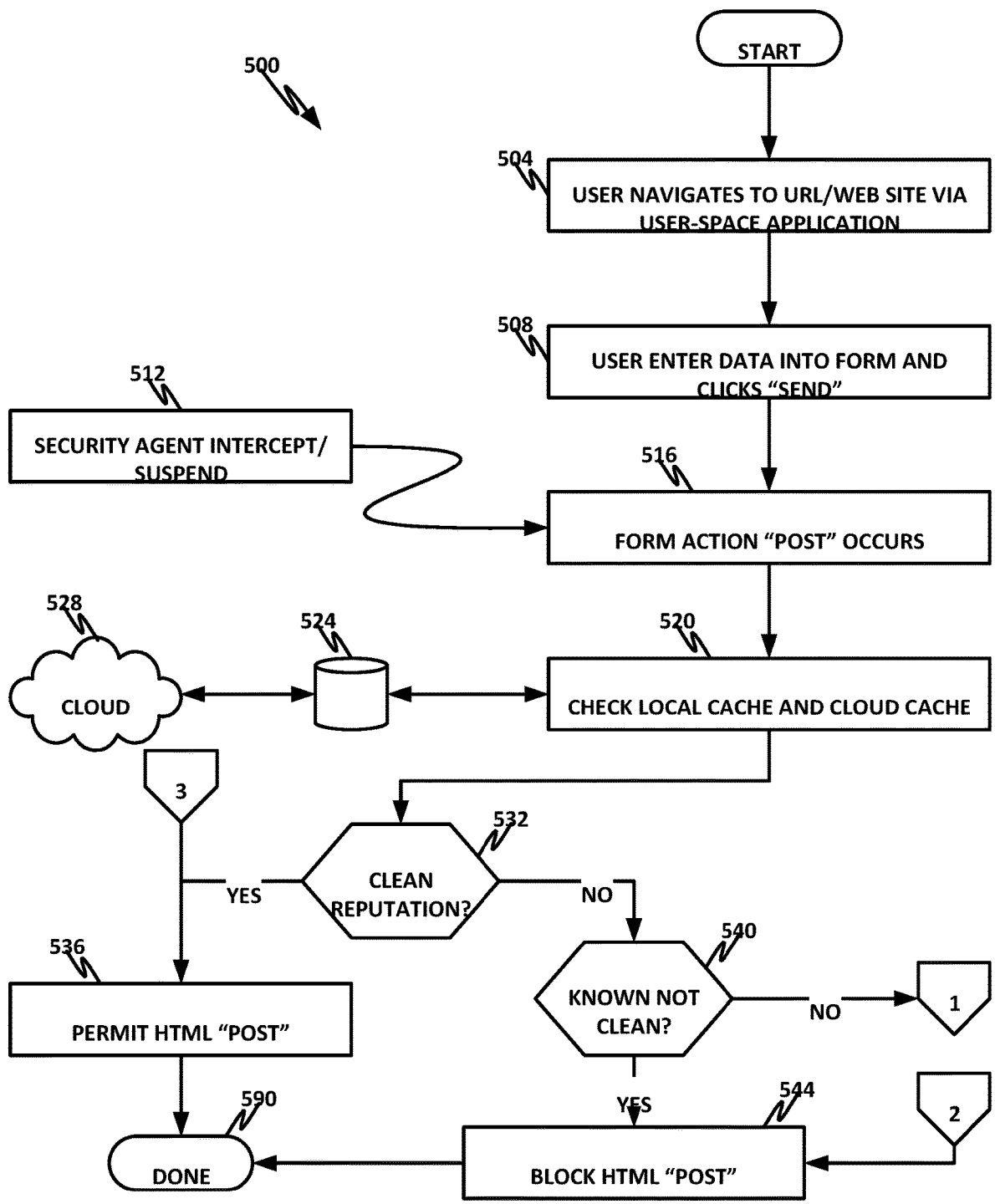
FIGS. 5A-5B are a flowchart of a method for mitigating against potential phishing attacks.
Figure 5B:
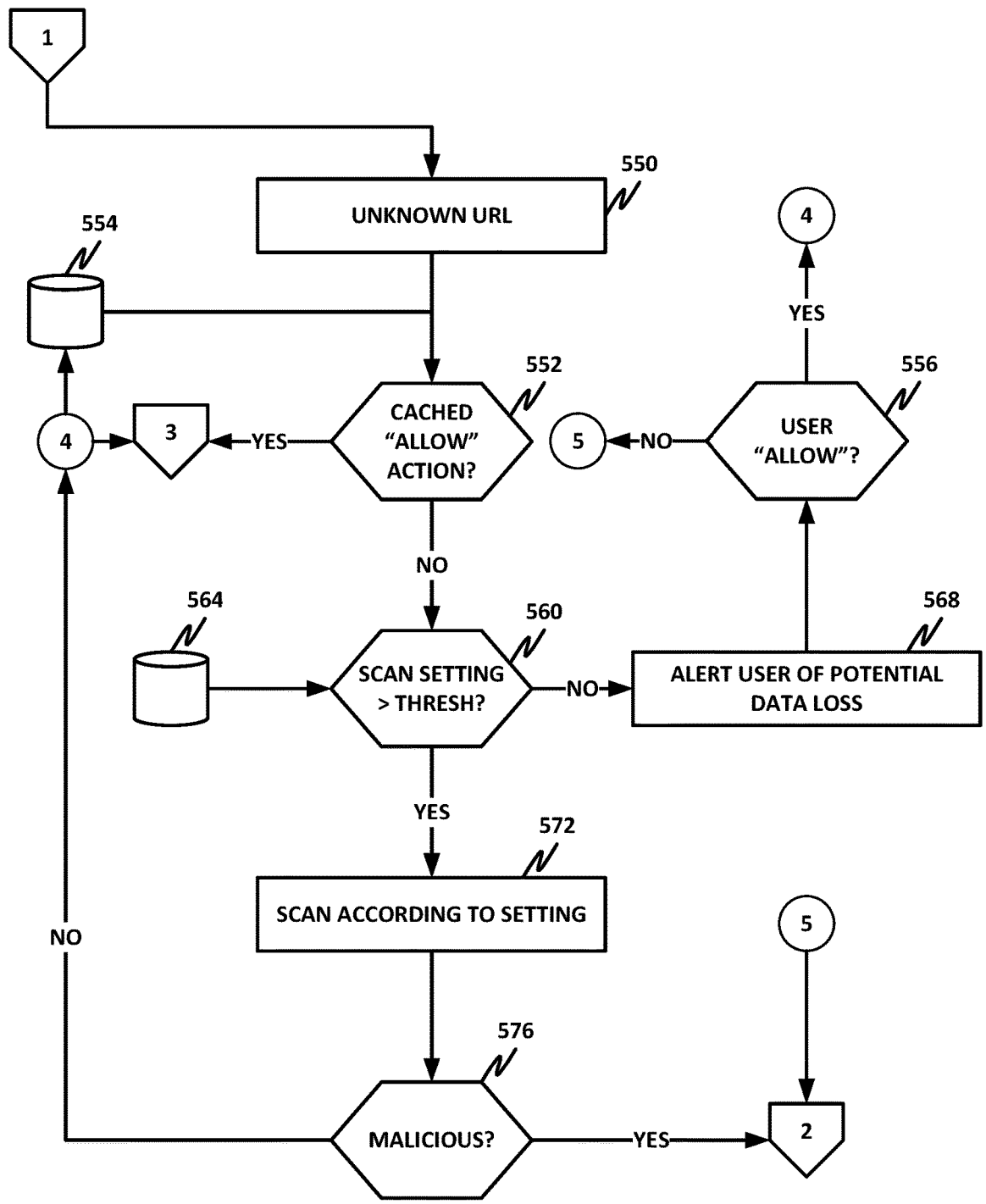

FIGS. 5A-5B are a flowchart of a method 500 for mitigating against potential phishing attacks.

Starting in block 504, a user of the device navigates to a URL or website via a user-space application. For example, the user may operate a web browser to go to the URL, or the user may use a native application to access remote resources. This could also include actions performed in the background or on behalf of the user, such as a background application that runs when the user logs in.

In block 508, the user enters data into a form and clicks "send." This operation is disclosed as an example of one way that a user may post data to the remote URL, or to a remote host pointed to by the URL. As discussed throughout this specification, there are many other ways by which data may be sent to the remote host via the network.

In block 516, the user-space application attempts to carry out the user post of information to the remote host. For example, a form post action occurs via HTML, or some other action occurs by which information, possibly including sensitive information, is sent to the remote host by (or on behalf of) the user.

In block 520, a security agent or other process on the device intercepts the attempted POST action, and at least temporarily suspends the action.

In block 520, while the attempted POST operation is suspended, the security agent first checks a local cache 524, to see if the URL has a locally cached reputation. If there is no locally cached reputation, then the security agent may also check a cloud resource 528 to see if there is a globally cached reputation.

In decision block 532, the security agent determines whether a clean reputation was returned for the URL. This decision presupposes that a reputation exists in the first place. The case where no reputation exists is handled elsewhere in the method.

If a claim reputation was returned, either by local cache 524 or by cloud 528, then in block 536, the security agent unsuspends the action and permits the HTML POST operation, or other operation that sends the data to the remote host.

Returning to decision block 532, if a clean reputation was not returned, then in decision block 540, the security agent checks whether a known, "not clean" reputation was provided. If a known not clean reputation was provided, then in block 544, the security agent may block the HTML POST operation, or other operation that will provide data to the remote host.

Returning to decision block 540, if there is no known reputation (e.g., there is not a known clean reputation and there is not a known not clean reputation), then following off-page connector 1 to FIG. 5B, in block 550, the security agent may determine that this is an unknown URL. Because this is an attempted user POST operation to an unknown URL, the security agent will take appropriate action for the unknown URL.

In decision block 552, the security agent queries a local decision cache 554, to determine whether there is a cached "allow" action for this URL. In other words, has the user encountered this identical URL before and allowed the POST operation for this URL? Alternatively, even if it is not the identical URL, it may be a substantially identical or sufficiently similar URL that the cached allow decision can be imputed from the previous URL to the new URL.

If there is a cached allow action, then following off-page connector 3 back to FIG. 5A, in block 536, the security agent permits the HTML POST operation, the action is unsuspended, and the user continues the operation.

Returning to decision block 552 of FIG. 5B, if there is no cached allow action, then in decision block 560, the security agent queries settings store 564 to determine if there is a scan setting for scanning unknown URLs. After retrieving the scan setting from settings store 564, the security agent determines whether the scan setting is above a threshold. For example, the security agent may determine whether aggressive scanning has been set, or if there is a more granular setting, whether the setting is above a threshold determined for a sufficiently reliable scan.

If the scan setting is not above the threshold, then in block 568, the security agent may notify the user of potential data loss because a reliable reputation for the URL cannot be determined. In some cases, the security agent may present the user with an option to perform a one-time aggressive scan on the suspicious URL. Otherwise, proceeding to decision block 556, the security agent determines whether the user allowed the data to post, despite the warning. If the post was allowed, then following on-page connector 4, this decision may be cached in decision cache 554, and following off-page connector 3 to FIG. 5A, in block 536, the POST operation is permitted.

Returning to decision block 556, if the user does not allow the post despite the warning, then following on-page connector 5 to off-page connector 2, in FIG. 5A, block 544, the security agent blocks the attempted POST operation.

Returning to decision block 560, if the scan setting is above the threshold, then in block 572, the security agent scans the URL, and/or a resource pointed to by the URL according to the security settings. The security agent makes a heuristic or other logical determination of whether the resource is malicious (e.g., a phishing attack).

In decision block 576, if the resource is determined to be malicious, then following off-page connector 2 to FIG. 5A, in block 544, the attempted operation is blocked.

Returning to decision block 576, if it is determined that the resource is not malicious, then this determination may also be cached in local cache 554 so that there is no need for an aggressive scan of the website in future interactions. Again, following off-page connector 3 to FIG. 5A, in block 536, the POST operation is permitted, and in block 590, the method is done.

Figure 6:
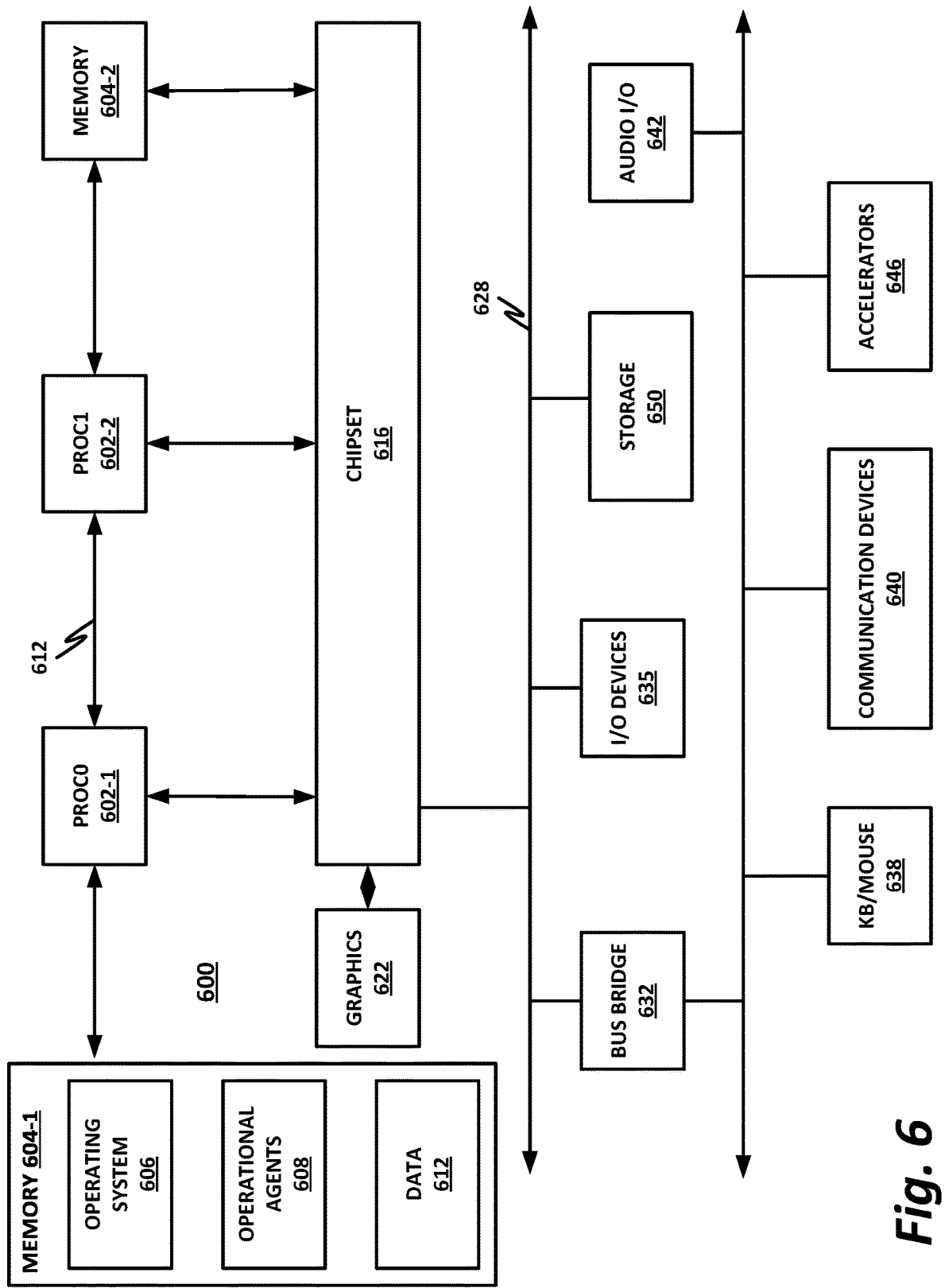
FIG. 6 is a block diagram of selected elements of a hardware platform.

FIG. 6 is a block diagram of a hardware platform 600. Embodiments of hardware platform 600 may be configured or adapted to provide a user-triggered URL scan as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high-performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, Internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via network interface 648, or retrieved from another source via any suitable interconnect. Once received (from any source), the instructions may be loaded into memory 604, and may then be executed by one or more processor 602 to provide elements such as an operating system 606, operational agents 608, or data 612.

Figure 8:
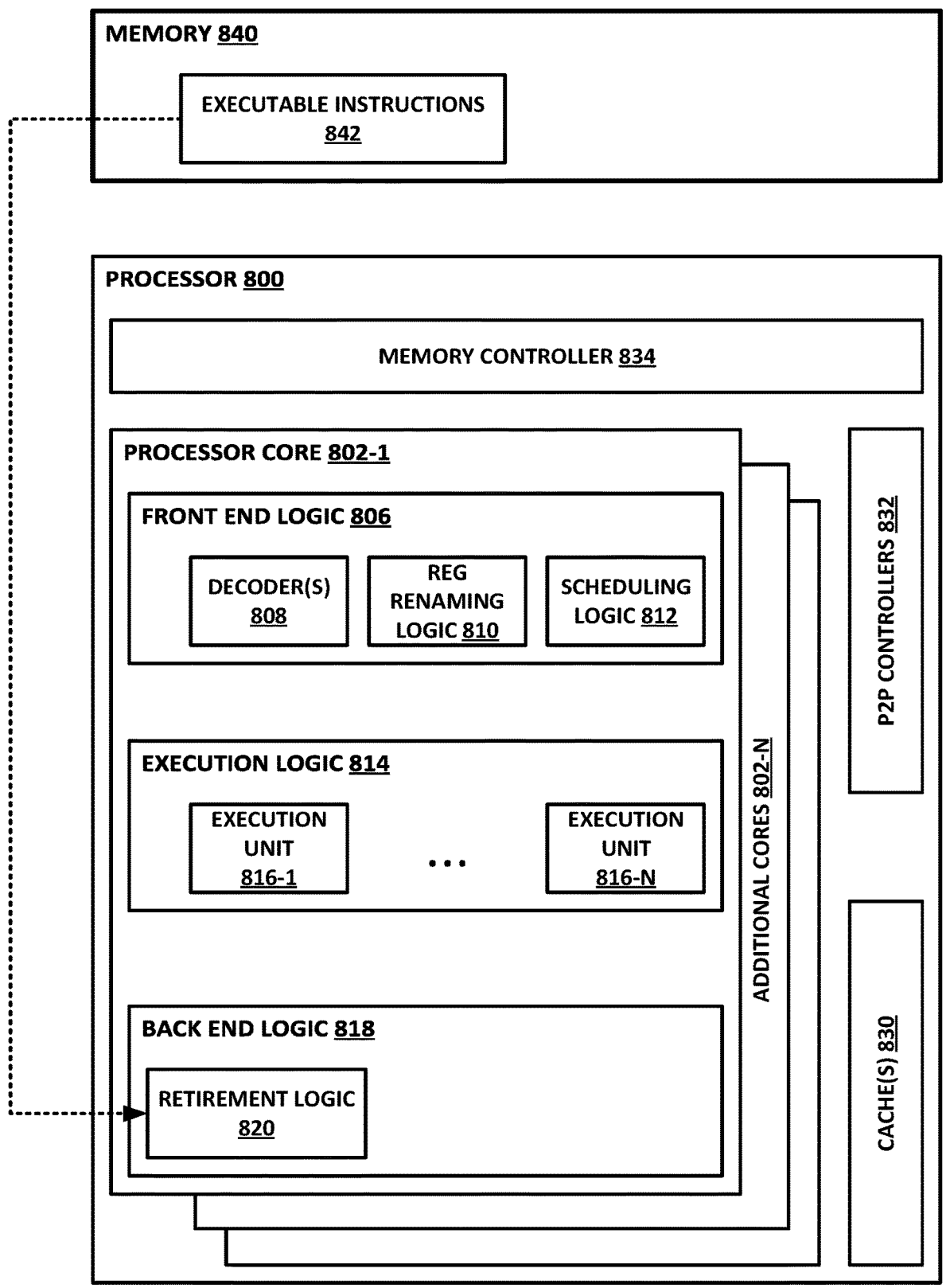
FIG. 8 is a block diagram of selected elements of a processor.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Details of processors 602 are not illustrated in this FIGURE, but one embodiment is illustrated in FIG. 8. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high-performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a central processor unit (CPU) or on one or more different dies or packages. Each chipset may support any suitable number of CPUs 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with processor 610 via a bus. For example, some memories may be connected via a system bus, or in a data center, memory may be accessible in a remote DMA (RDMA) configuration.

Memory 604 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of CPUs 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high-definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, network interface 648, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by network interface 648 and the various I/O devices described herein. This may include, for example, various universal serial bus (USB), FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, USB, FireWire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O devices 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more non-transitory computer-readable mediums having stored thereon executable instructions operable to instruct a processor to provide operational functions. At an appropriate time, such as upon booting hardware platform 600 or upon a command from operating system 606 or a user or security administrator, processor 602 may retrieve a copy of the operational agent (or software portions thereof) from storage 650 and load it into memory 604. Processor 610 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 648 may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 648 may include one or more physical ports that may couple to a cable (e.g., an Ethernet cable, other cable, or waveguide).

In some cases, some or all of the components of hardware platform 600 may be virtualized, in particular the processor(s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 7. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 7:
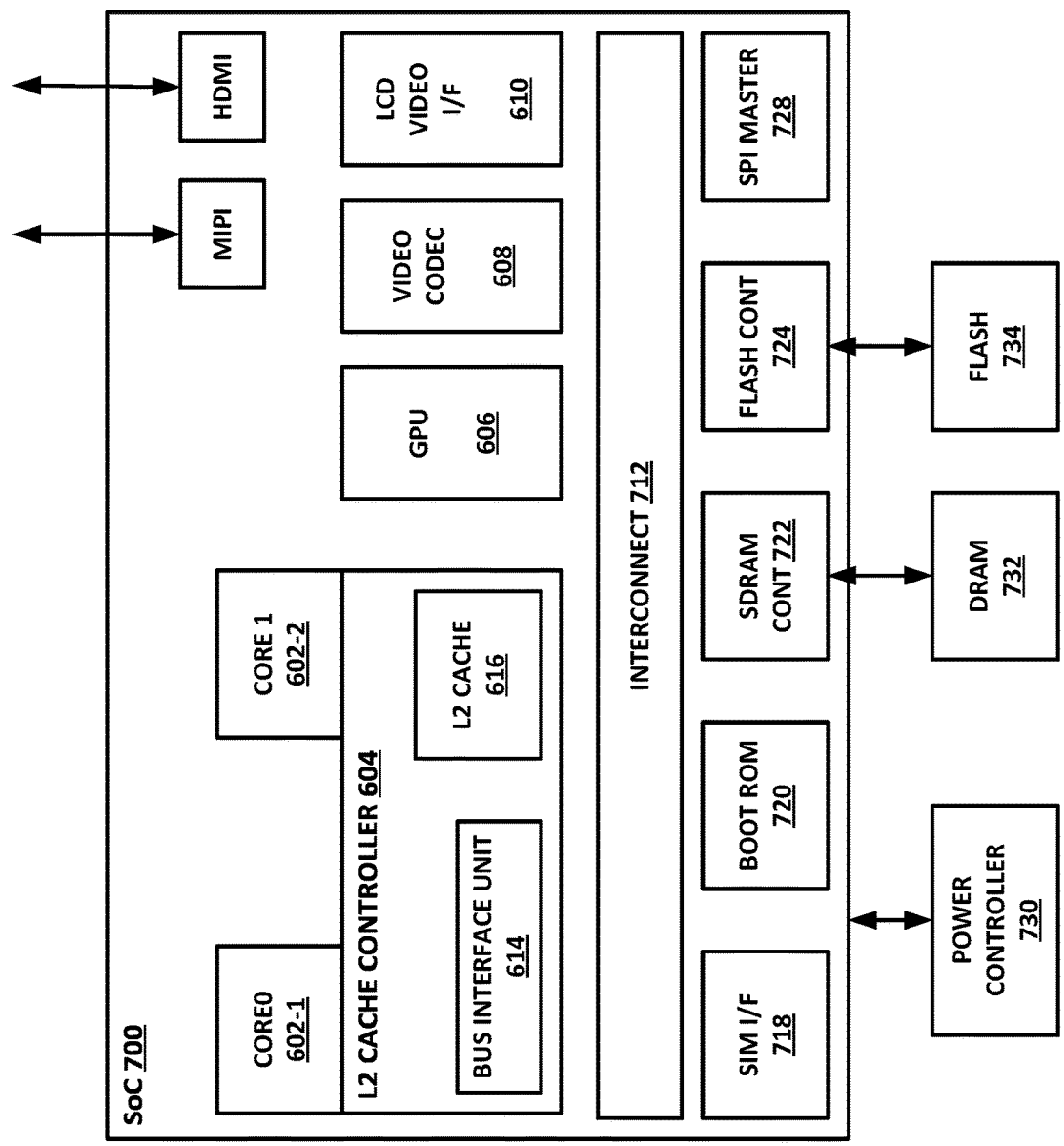
FIG. 7 is a block diagram of selected elements of a system-on-a-chip (SoC).

FIG. 7 is a block illustrating selected elements of an example SoC 700. Embodiments of SoC 700 may be configured or adapted to provide a user-triggered URL scan as disclosed in the present specification.

At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a PC, server, video processing components, laptop computer, notebook computer, NetBook, or touch-enabled device.

As with hardware platform 600 above, SoC 700 may include multiple cores 702a and 702b. In this illustrative example, SoC 700 also includes an L2 cache control 704, a GPU 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/HDMI links that couple to an LCD.

SoC 700 may also include a subscriber identity module (SIM) I/F 718, a boot ROM 720, a synchronous dynamic random access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 738, a global positioning system (GPS) 740, and an 802.11 Wi-Fi 742.

Designers of integrated circuits such as SoC 700 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 8 is a block diagram illustrating selected elements of a processor 800. Embodiments of processor 800 may be configured or adapted to provide a user-triggered URL scan as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 800 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 800 includes one or more processor cores 802, including core 802-1-802-N. Cores 802 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 800 may include at least one shared cache 830, which may be treated logically as part of memory 840. Caches 830 may be filled according to known caching techniques, and may store instructions and/or data that may be used by one or more components of processor 800.

Processor 800 may include an integrated memory controller (MC) 834, to communicate with memory 840. Memory controller 834 may include logic and circuitry to interface with memory 840, and may also include a cache controller to handle filling and evicting instructions and data to and from cache 830.

By way of example, each core 802 may include front-end logic 806, execution logic 814, and backend logic 818.

In the illustrated embodiment, front-end logic 806 includes an instruction decoder or decoders 808, register renaming logic 810, and scheduling logic 812. Decoder 808 may decode instructions received. Register renaming logic 810 may provide register renaming, for example to facilitate pipelining. Scheduling logic 812 may schedule instruction execution, and may provide out-of-order (OOO) execution. Front-end logic 806 may fetch incoming instructions, perform various processing (e.g., caching, decoding, branch predicting, etc.), and pass instructions to execution logic 814.

Execution logic 814 includes one or more execution units 816-1-816-N. Execution units 816 may include hardware instructions and microcode to carry out the provided instructions.

Backend logic 818 includes retirement logic 820. Core 802 may provide for speculative execution of instructions, branch prediction, and similar. Retirement logic 820 may be configured to determine which predicted instructions were actually needed by the program flow.

Processor 800 may also include a PtP controller 832, which enables connection to an uncore, chipset, Northbridge, Southbridge, or bus, by way of example.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure as claimed, and the exclusion of certain elements from the FIGURES is not intended to imply that the element is to be excluded from the disclosure as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a hardware platform comprising a processor and a memory; a network interface; a user-space application comprising instructions to interact with a web site via a uniform resource locator (URL); and a security agent comprising instructions to: intercept an interaction of the user-space application with the web site; determine that the intercepted interaction is to send sensitive information to the web site; suspend the interaction; and assign a reputation to the URL.

There is further disclosed an example computing apparatus, wherein the security agent is further to take a security action based at least in part on the reputation of the URL.

There is further disclosed an example computing apparatus, wherein assigning the reputation to the URL comprises performing a deep security analysis of the web site.

There is further disclosed an example computing apparatus, wherein the deep security analysis comprises analyzing the web site's code for phishing features.

There is further disclosed an example computing apparatus, wherein assigning the reputation comprises querying a user feature for a deep analysis flag, and performing deep analysis only if the deep analysis flag is set.

There is further disclosed an example computing apparatus, further comprising determining that the deep analysis flag is not set, and warning the user of a potential for data loss because the web site has not been analyzed via deep analysis.

There is further disclosed an example computing apparatus, wherein assigning the reputation comprises querying a user-configurable scan aggressiveness option, and performing a scan of the web site's code for phishing features according to the user-configurable scan aggressiveness option.

There is further disclosed an example computing apparatus, wherein the security agent is further to warn the user if the user-configurable scan aggressiveness option is set below a threshold.

There is further disclosed an example computing apparatus, wherein the security agent is further to warn the user of potential data loss, and send the sensitive information only after receiving confirmation from the user.

There is further disclosed an example computing apparatus, wherein the security agent is further to cache a response from the user in a response cache.

There is further disclosed an example computing apparatus, wherein the security agent is further to: query the response cache; determine that the user has previously permitted sensitive information to be submitted to the web site; and permit the sensitive information to be submitted without requiring a further response from the user.

There is further disclosed an example computing apparatus, wherein assigning the reputation to the website comprises querying a cloud-based reputation cache, and receiving a reputation for the website from the cloud-based reputation cache.

There is further disclosed an example computing apparatus, wherein assigning the reputation to the website further comprises first querying a local cache of the cloud-based reputation cache, and querying the cloud-based reputation cache only if no locally cached reputation exists in the local cache.

There is further disclosed an example computing apparatus, wherein assigning the reputation to the website further comprises determining that a cloud-based reputation from the cloud-based reputation cache is unknown, and triggering a local deep analysis of the web site.

There is further disclosed an example computing apparatus, wherein triggering the local deep analysis of the web site comprises first querying a local deep analysis configuration option, and performing a deep analysis only if the local deep analysis configuration option is set.

There is further disclosed an example computing apparatus, wherein the security agent is further to warn the user of potential data loss if the local deep analysis configuration option is not set.

There is further disclosed an example computing apparatus, wherein the sensitive information comprises a password.

There is further disclosed an example computing apparatus, wherein the sensitive information comprises a username and password combination.

There is further disclosed an example computing apparatus, wherein the sensitive information comprises personally-identifying information.

There is further disclosed an example computing apparatus, wherein detecting the user interaction comprises detecting a hypertext markup language POST operation.

There is also disclosed an example of one or more tangible, non-transitory computer-readable storage mediums having stored thereon executable instructions to instruct a processor to: insert or register operating system hooks to enable interception of user-space processes; determine that a user-space process is attempting to interact with an internet resource identified by a uniform resource locator (URL); suspend the attempt; while the attempt is suspended, assign a reputation to the URL; and take a security action based on the reputation of the URL.

There is further disclosed an example of one or more tangible, non-transitory computer-readable mediums, wherein assigning the reputation to the URL comprises performing a deep security analysis of the internet resource.

There is further disclosed an example of one or more tangible, non-transitory computer-readable mediums, wherein the deep security analysis comprises analyzing the internet resource's code for phishing features.

There is further disclosed an example of one or more tangible, non-transitory computer-readable mediums, wherein assigning the reputation comprises querying a user feature for a deep analysis flag, and performing deep analysis only if the deep analysis flag is set.

There is further disclosed an example of one or more tangible, non-transitory computer-readable mediums, wherein the instructions are further to determine that the deep analysis flag is not set, and warning the user of a potential for data loss because the internet resource has not been analyzed via deep analysis.

There is further disclosed an example of one or more tangible, non-transitory computer-readable mediums, wherein assigning the reputation comprises querying a user-configurable scan aggressiveness option, and performing a scan of the internet resource's code for phishing features according to the user-configurable scan aggressiveness option.

There is further disclosed an example of one or more tangible, non-transitory computer-readable mediums, wherein the instructions are further to warn the user if the user-configurable scan aggressiveness option is set below a threshold.

There is further disclosed an example of one or more tangible, non-transitory computer-readable mediums, wherein the instructions are further to warn the user of potential data loss, and send the sensitive information only after receiving confirmation from the user.

There is further disclosed an example of one or more tangible, non-transitory computer-readable mediums, wherein the instructions are further to cache a response from the user in a response cache.

There is further disclosed an example of one or more tangible, non-transitory computer-readable mediums, wherein the instructions are further to: query the response cache; determine that the user has previously permitted sensitive information to be submitted to the internet resource; and permit the sensitive information to be submitted without requiring a further response from the user.

There is further disclosed an example of one or more tangible, non-transitory computer-readable mediums, wherein assigning the reputation to the website comprises querying a cloud-based reputation cache, and receiving a reputation for the website from the cloud-based reputation cache.

There is further disclosed an example of one or more tangible, non-transitory computer-readable mediums, wherein assigning the reputation to the website further comprises first querying a local cache of the cloud-based reputation cache, and querying the cloud-based reputation cache only if no locally cached reputation exists in the local cache.

There is further disclosed an example of one or more tangible, non-transitory computer-readable mediums, wherein assigning the reputation to the website further comprises determining that a cloud-based reputation from the cloud-based reputation cache is unknown, and triggering a local deep analysis of the internet resource.

There is further disclosed an example of one or more tangible, non-transitory computer-readable mediums, wherein triggering the local deep analysis of the internet resource comprises first querying a local deep analysis configuration option, and performing a deep analysis only if the local deep analysis configuration option is set.

There is further disclosed an example of one or more tangible, non-transitory computer-readable mediums, wherein the instructions are further to warn the user of potential data loss if the local deep analysis configuration option is not set.

There is further disclosed an example of one or more tangible, non-transitory computer-readable mediums, wherein the sensitive information comprises a password.

There is further disclosed an example of one or more tangible, non-transitory computer-readable mediums, wherein the sensitive information comprises a username and password combination.

There is further disclosed an example of one or more tangible, non-transitory computer-readable mediums, wherein the sensitive information comprises personally-identifying information.

There is further disclosed an example of one or more tangible, non-transitory computer-readable mediums, wherein detecting the user interaction comprises detecting a hypertext markup language POST operation.

There is also disclosed an example computer-implemented method of providing browser-based phishing mitigation for a web site, the method comprising: detecting a user interaction with a web site via the browser, the user interaction comprising sending sensitive information to the web site; suspending the user interaction; while the user interaction is suspended, assigning a reputation to the web site; and taking a security action based on the assigned reputation.

There is further disclosed an example computer-implemented method, wherein assigning the reputation to the website comprises performing a deep security analysis of the website.

There is further disclosed an example computer-implemented method, wherein the deep security analysis comprises analyzing the website's code for phishing features.

There is further disclosed an example computer-implemented method, wherein assigning the reputation comprises querying a user feature for a deep analysis flag, and performing deep analysis only if the deep analysis flag is set.

There is further disclosed an example computer-implemented method, further comprising determining that the deep analysis flag is not set, and warning the user of a potential for data loss because the website has not been analyzed via deep analysis.

There is further disclosed an example computer-implemented method, wherein assigning the reputation comprises querying a user-configurable scan aggressiveness option, and performing a scan of the web site's code for phishing features according to the user-configurable scan aggressiveness option.

There is further disclosed an example computer-implemented method, further comprising warning the user if the user-configurable scan aggressiveness option is set below a threshold.

There is further disclosed an example computer-implemented method, further comprising warning the user of potential data loss, and sending the sensitive information only after receiving confirmation from the user.

There is further disclosed an example computer-implemented method, further comprising caching a response from the user in a response cache.

There is further disclosed an example computer-implemented method, further comprising: querying the response cache; determining that the user has previously permitted sensitive information to be submitted to the web site; and permitting the sensitive information to be submitted without requiring a further response from the user.

There is further disclosed an example computer-implemented method, wherein assigning the reputation to the website comprises querying a cloud-based reputation cache, and receiving a reputation for the website from the cloud-based reputation cache.

There is further disclosed an example computer-implemented method, wherein assigning the reputation to the website further comprises first querying a local cache of the cloud-based reputation cache, and querying the cloud-based reputation cache only if no locally cached reputation exists in the local cache.

There is further disclosed an example computer-implemented method, wherein assigning the reputation to the website further comprises determining that a cloud-based reputation from the cloud-based reputation cache is unknown, and triggering a local deep analysis of the web site.

There is further disclosed an example computer-implemented method, wherein triggering the local deep analysis of the web site comprises first querying a local deep analysis configuration option, and performing a deep analysis only if the local deep analysis configuration option is set.

There is further disclosed an example computer-implemented method, further comprising warning the user of potential data loss if the local deep analysis configuration option is not set.

There is further disclosed an example computer-implemented method, wherein the sensitive information comprises a password.

There is further disclosed an example computer-implemented method, wherein the sensitive information comprises a username and password combination.

There is further disclosed an example computer-implemented method, wherein the sensitive information comprises personally-identifying information.

There is further disclosed an example computer-implemented method, wherein detecting the user interaction comprises detecting a hypertext markup language POST operation.

There is also disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is also disclosed an example of at least one computer-readable medium comprising instructions that, when executed, implement a method or realize an apparatus as illustrated in a number of the above examples.

What is claimed is:

1. A computing apparatus, comprising:
   a hardware platform comprising a processor and a memory;
   a network interface;
   a user-space application comprising instructions to interact with a web site via a uniform resource locator (URL); and
   a security agent comprising instructions to:
      intercept an interaction of the user-space application with the web site;
      determine that the intercepted interaction is a hypertext markup language (HTML) POST operation that will send information to the web site;
      based at least in part on detecting the HTML POST operation, suspend the interaction;
      while the interaction is suspended, assign a reputation to the URL comprising analyzing code of the web site for phishing features, wherein assigning the reputation comprises querying a user-configurable scan aggressiveness option, and performing a scan of code of the web site for phishing features according to the user-configurable scan aggressiveness option; and
      upon determining that phishing features are found, warn a user of the computing apparatus while the interaction is suspended.

2. The computing apparatus of claim 1, wherein the security agent is further to take a security action based at least in part on the reputation of the URL.

3. The computing apparatus of claim 1, wherein assigning the reputation to the URL comprises performing a deep security analysis of the web site.

4. The computing apparatus of claim 1, wherein assigning the reputation comprises querying a user feature for a deep analysis flag, and performing deep analysis upon determining that the deep analysis flag is set.

5. The computing apparatus of claim 4, further comprising determining that the deep analysis flag is not set, and warning the user of a potential for data loss because the web site has not been analyzed via deep analysis.

6. The computing apparatus of claim 1, wherein the security agent is further to warn the user upon determining that the user-configurable scan aggressiveness option is set below a threshold.

7. The computing apparatus of claim 1, wherein the security agent is further to warn the user of potential data loss, and send sensitive information only after receiving confirmation from the user.

8. The computing apparatus of claim 7, wherein the security agent is further to cache a response from the user in a response cache.

9. The computing apparatus of claim 8, wherein the security agent is further to:
   query the response cache;
   determine that the user has previously permitted sensitive information to be submitted to the web site; and
   permit the sensitive information to be submitted without requiring a further response from the user.

10. The computing apparatus of claim 1, wherein assigning the reputation to the web site comprises querying a cloud-based reputation cache, and receiving a reputation for the web site from the cloud-based reputation cache.

11. The computing apparatus of claim 10, wherein assigning the reputation to the web site further comprises first querying a local cache of the cloud-based reputation cache, and querying the cloud-based reputation cache upon determining that no locally cached reputation exists in the local cache.

12. One or more tangible, non-transitory computer-readable storage mediums having stored thereon executable instructions to instruct a processor to:
   insert or register operating system hooks to enable interception of user-space processes;
   determine that a user-space process is attempting to interact with an internet resource identified by a uniform resource locator (URL) via a hypertext markup language (HTML) POST operation;
   suspend the attempt based at least in part on identifying the HTML POST operation;
   while the attempt is suspended, assign a reputation to the URL, comprising analyzing code of a web site at the URL for phishing features, wherein analyzing the code of the web site comprises querying a user-configurable scan aggressiveness option, and performing a scan of code of the web site for phishing features according to the user-configurable scan aggressiveness option; and
   upon determining that phishing features are found, warn a user while the attempt is suspended.

13. The one or more tangible, non-transitory computer-readable mediums of claim 12, wherein assigning the reputation to the web site comprises querying a cloud-based reputation cache, and receiving a reputation for the web site from the cloud-based reputation cache.

14. The one or more tangible, non-transitory computer-readable mediums of claim 13, wherein assigning the reputation to the web site further comprises first querying a local cache of the cloud-based reputation cache, and querying the cloud-based reputation cache upon determining that no locally cached reputation exists in the local cache.

15. The one or more tangible, non-transitory computer-readable mediums of claim 13, wherein assigning the reputation to the web site further comprises determining that a cloud-based reputation from the cloud-based reputation cache is unknown, and triggering a local deep analysis of the internet resource.

16. A computer-implemented method of providing browser-based phishing mitigation for a web site, the method comprising:
   detecting a user interaction with a web site via the browser, the user interaction comprising a hypertext markup language (HTML) POST operation;

suspending the user interaction based at least in part on detecting the HTML POST operation;
while the user interaction is suspended, assigning a reputation to the web site, comprising analyzing the web site's code for phishing features, wherein assigning the reputation comprises querying a user-configurable scan aggressiveness option, and performing a scan of code of the web site for phishing features according to the user-configurable scan aggressiveness option; and
upon determining that phishing features are found, while the user interaction is suspended, warn a user who initiated the user interaction.

17. The computer-implemented method of claim 16, wherein assigning the reputation to the web site comprises performing a deep security analysis of the web site.

18. The computer-implemented method of claim 17, wherein the deep security analysis comprises analyzing code of the web site for phishing features.

\* \* \* \* \*